Feb. 4, 1964
C. A. HACKING
3,120,648
RAPID MICROWAVE SCANNER
Filed March 13, 1961
2 Sheets-Sheet 1
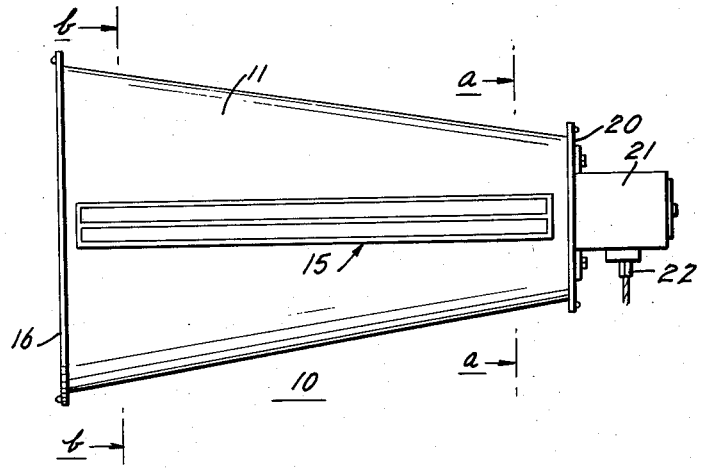
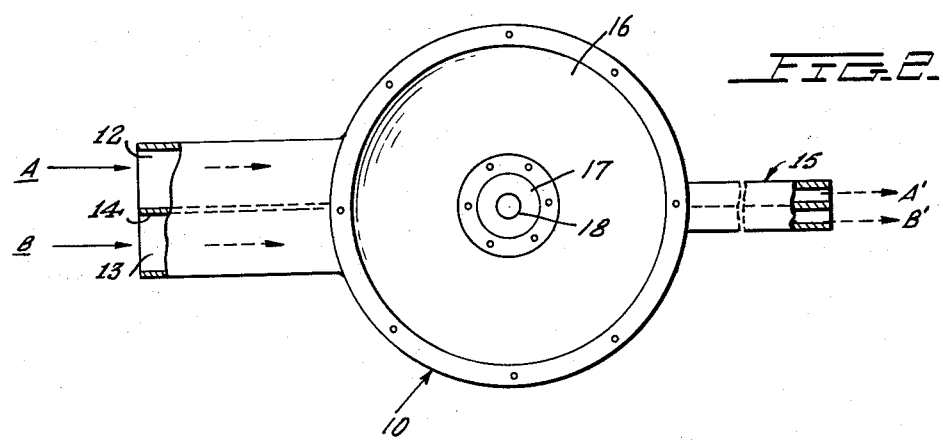
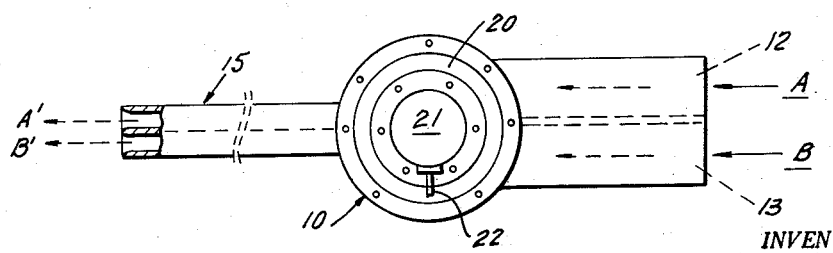
INVENTOR.
COLIN A. HACKING
BY
OSTROLENK, FABER, GERB & SOFFEN
ATTORNEYS

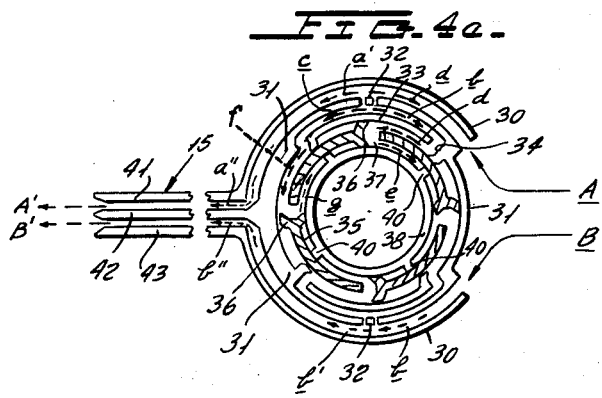
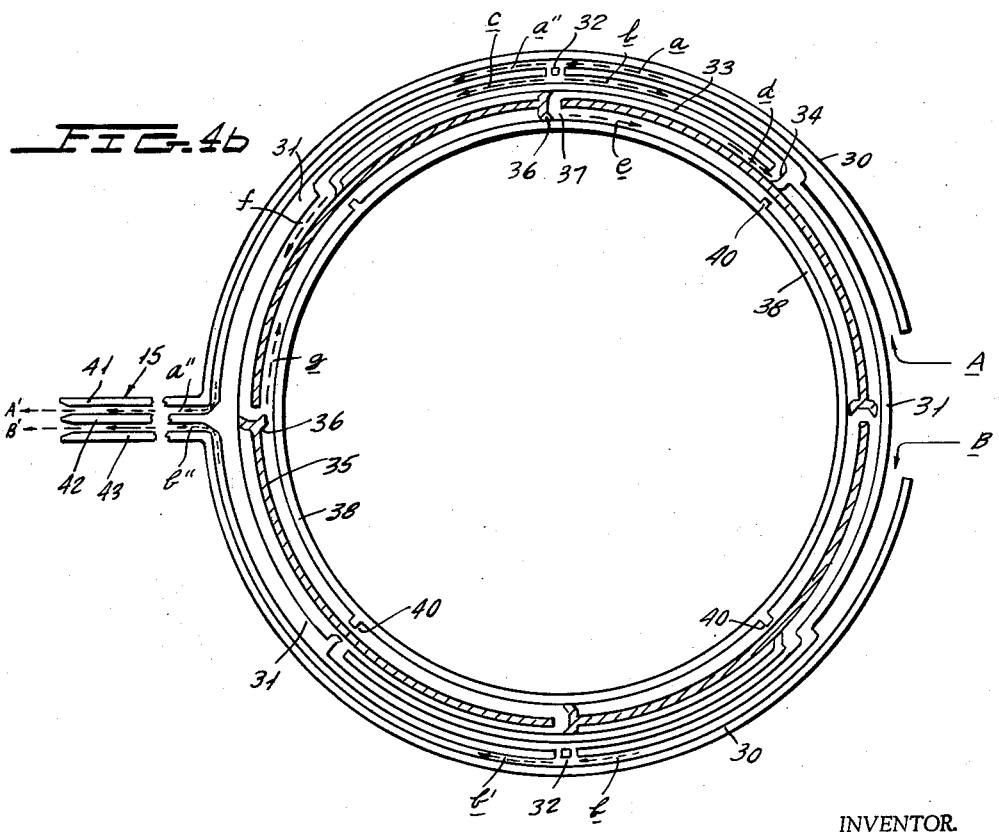

United States Patent Office 3,120,648
Patented Feb. 4, 1964

3,120,648
RAPID MICROWAVE SCANNER
Colin A. Hacking, Palo Alto, Calif., assignor to I-T-E Circuit Breaker Company, Philadelphia, Pa., a corporation of Pennsylvania
Filed Mar. 13, 1961, Ser. No. 95,274
6 Claims. (Cl. 333—31)

This invention relates to novel microwave scanners for controlling the direction of propagation of energy from microwave line sources.

A widely used rapid microwave scanner is known as the Foster scanner. This term refers to a well known technique of mechanically varying the direction of propagation of a collimated line source of electromagnetic energy, by increasing the physical path length of the beam by different amounts. More specifically, the line source is propagated within a parallel plate region formed within conical surfaces, such that the path length therebetween is increased in a linear manner. By increasing the path length in a linear manner, the phase front will remain a straight line, varying in angle of directivity proportional to the path length differential.

Upon each revolution of the rotor, the phase front of the emergent signal is changed to a predetermined angular extent, along the conical array. A parallel plate region transmission line is coupled to the oscillated signal wave front, and conducted from the scanner to an associated reflector, generally of a parabolic cylindrical section. The rapidly scanned beam is utilized in many types of short wave radar systems, as for sector scanning, missle tracking, and the like.

The conventional Foster scanner includes relatively rotatable conical members, with the line source signal being introduced along the length thereof. In one form of Foster scanner the line source is introduced to an elongated input aperture along one side of an outer conical shell. An inner conical member is provided which includes a diametric path rotatable about the axis of the cone. The energy introduced at the input aperture is coupled into the diametric path of the inner rotating member, and leaves at an output aperture along a diametrically opposite surface of the outer shell. When the diametric path of the inner member coincides with the input and output apertures along the outer member, the fixed reference phase appears across the output. As the inner conical member is rotated, additional phase delay is introduced along the linear phase front, with such phase delay being dependent upon the angular orientation of the cone; progressively increasing from the apex to the base region of the conical arrangement. In another form of Foster scanner the signal is introduced internally of the conical members by a microwave line source and passes via a rotating conical path to an output aperture along the periphery of the conical shell. In this structure, the scan angle is likewise determined by the differential path length between the cone apex and base regions of the relatively rotating conical members.

The scan angle capabilities of the heretofore practiced arrangements have been limited by the path length variation effected within conical units. That is, in both the arrangements wherein the signal is introduced and removed at diametrically opposite peripheral portions of the cone and that where a conical path rotates intermediate the centrally located input and peripherally located output, the phase variation is substantially the diameter variation between the apex and the base of the cone, necessitating large structures for appreciable scan angles. My invention advantageously permits a substantial increase in the scan angle capabilities, by directional coupling the energy and providing a multi-reflected path arrangement within the conical structure, thereby permitting increased path length differential substantially in excess of the external diametric variation of the unit.

In accordance with the present invention, the incident signal wave from the line source is split into two equal components that are directed in opposite paths to the rotor, then upon reflection recombined with a resultant phase shift along its wave front. A broad band three db directional coupler operating in a parallel plate mode is incorporated along the conical stator, within which the novel rotor operates. Advantageously, the line source is not required interiorly of the invention scanner, its signals being impressed upon the rotor. Further, two independent channels may be simultaneously rapidly scanned by the invention hereof, as requisite in a monopulse radar system for one plane, as the vertical plane. That is, the requisite sum and difference signals required to accurately locate the target with respect from the main beam axis may be obtained with increased symmetric identity over the heretofore practiced arrangements necessitating a duplication of hardware.

It is, accordingly, an object of the present invention to provide a novel rapid microwave scanner that can simultaneously combine two signal wave fronts into a common scanning plane.

Another object of the present invention is to provide a novel rapid microwave scanner incorporating a three db directional coupler that splits incident signal waves into two equal parts for separate traverse, reflection and recombination at the coupler.

A further object of the present invention is to provide a novel rapid microwave scanner in which the microwave line source is applied through the stator.

These and other objects of the invention will become more apparent from the following description of an exemplary embodiment thereof, shown in the accompanying drawings, in which:

FIGURE 1 is an elevational view of the exemplary rapid scanner.

FIGURE 2 is an end view of the scanner of FIGURE 1, at the larger diameter end.

FIGURE 3 is an end view thereof, at the smaller diameter end.

FIGURE 4a is a cross-sectional view along line a—a of FIGURE 1, corresponding to the apex region of the conical unit.

FIGURE 4b is a similar transverse cross-section along lines b—b of FIGURE 1, corresponding to the base region of the conical scanning arrangement.

The exterior views of the invention scanner 10, FIGURES 1, 2 and 3, show the correlation of the conical stator 11 that houses the rotor (not shown); the two line source input guides 12, 13; and the dual output transmission line 15. An end plate 16 contains a central bearing 17 for rotor shaft 18. The minor end plate 20 mounts the rotor drive motor 21. An electrical cable 22 extends from motor 21. The motor 21 is arranged to suitably rotate the rotor within stator 11, to provide the desired rate of scanning tilting for the signal wave fronts A′, B′ emergent from output 15, as will be described hereinafter.

The input line sources A and B are two different channels, in the exemplary scanner system. Although the ensuing discussion is directed to a scanner 10 having two separate input line sources A and B, it should naturally be understood that the basic advantages of my invention in achieving increased scan angle capabilities may likewise be accomplished with the use of only one input signal, such as either A or B. However, the embodiment discussed herein, wherein two input channels are symmetrically operated upon, is particularly adaptable to a monopulse scanning arrangement, wherein the sum and difference monopulse signals to be compared for target location must be presented to identical scanning apparatus to insure accuracy of results. Previously, separate waveguide runs and scanners were used for each of the signals. In such systems minor variations in hardware duplication has had an adverse effect upon the results obtained. Thus, the instant invention, by permitting simultaneous scanning of both signals in a single device provides increased symmetry, and accordingly more accurate operation in such monopulse scanning systems.

The corresponding input wave guides 12, 13 may be adjacent across a common wall 14, or separated, being directed to the stator. In diagrammatic FIGURES 4a, 4b, the disposition of the line source A and B signals into the stator 11 is indicated by the directional arrows. The stator 11 is symmetrical above and below the horizontal central transverse plane, and therefore for the independent A and B input signals. The electrical transformation of lines signals A and B by scanner 10 is the same; and the action herein explained for signal A is therefore to be considered the same for line signal B by the other scanner half.

FIGURES 4a and 4b are cross-sectional views of the scanner 10, with the smaller diameter conical end section being shown in FIGURE 4a; and the larger diameter section being shown in FIGURE 4b. It is understood that the intermediate region of scanner 10 between FIGURES 4a and 4b is a continuous one, constituting gradually changing radial dimensions for all the scanner elements, in conical array.

The outer shell 30 is spaced by a predetermined amount from a fixed intermediate shell 31. The A and B signals are impressed, through input guides 12, 13 (see FIGURES 2, 3) to the annular spacing between shells 30, 31; with their directions being opposite, as indicated. The shells 30, 31 serve as an annular transmission guide for the impressed signals, conveying them to the respective three db directional couplers 32, 32. The couplers 32, 32 are coextensive with the conical stator, and are diagrammatically represented. The actual construction of couplers 32, 32 may correspond in principle of operation to any one of numerous types of conventional waveguide directional couplers; as for example, the couplers discussed in pages 346–352 of the well known text Principles and Applications of Waveguide Transmission by George C. Southworth, published 1950 by the D. Van Nostrand Company, Inc. As is known to those skilled in the art, a three db directional coupler is a device that splits a unity wave front signal into two equal energy parts of 0.707 magnitude; and directs them into opposite directions.

Referring to signal A, which is in practice preferably a TEM signal wave, when it reaches region a at coupler 32, thereupon passes through the coupler. The longitudinal coupler 32 shown diagrammatically in FIGURES 4a and 4b splits wave A into two equal parts directed along opposite paths b and c in the annular passage between shell 31 and sector plate 33. The b wave section then impinges upon wall 34 in shell 31, and is redirected by 180° into path d between sector plate 33 and rotor 35.

The d wave impinges upon the rear of one of four tail sections 36 of the rotor 35. Between the rotor body and the tail sections 36 are associated passages 37 through which the d wave is directed. The resultant reversed wave is shown at e, in the passage between the rotor 35 and inner stator shell 38. The e wave thereupon impinges against a reflecting barrier 40, at the end of its inward scanner path. The barrier 40 is a non-contacting projection from shell 38 across the passage with rotor 35, effecting a short-circuit for the microwave signal e.

The wave e reaching reflecting barrier 40 reversed in its own passage by 180° and is caused to retrace its paths in the reverse direction along those indicated at e, d and b successively until it reaches the coupler 32. Thus reflected wave passes again through the coupler 32 from the inner to the outer direction and emerges as part of wave a', to be described hereinafter.

The tips of the tails 36 of the rotor 35 are proportioned as chokes, being broadly resonant to signals of the system frequencies, to prevent leakage behind them. This insures clean-cut separation of the channels A and B, as well as the indicated split wave operation of the invention scanner. The choke portions on tails 36 of rotor 35 are formed as teeth of a comb or rakes in intermeshing relation with the reflecting barriers 40 as well as the tips of reflecting walls 34. Such toothed intermeshing does not interfere with the described composite path operation, in a manner akin to the usual Foster scanner arrangement.

The second half-energy part c of the incident a wave, passes to an inner level by the shaped intermediate ring 31, at wave f. The f wave is reversed 180° into a further radially inward path, as wave g, through the bend effected by the tail (36) of the rotor. Wave g is thereupon reversed by a reflecting barrier 40; to retraverse the g, f and c paths until it reaches the three db directional coupler 32.

The two barrier (40) reversed waves thus return to the coupler 32, each in the direction opposite to that from which it first emerged therefrom. The return waves travel through a very high standing wave in the passages. Upon their return to coupler 32, they recombine as a unity magnitude wave a' in the direction (counterclockwise) out of coupler 32. The new a' wave is in effect a continuation of the original a wave from the A channel, but phase displaced therefrom, and in the outer stator channel between shells 30, 31.

The phase of the recombined a' wave that emerges from the coupler 32 depends upon the angular position of the rotor 35 with respect to the stator 11. Thus, as rotor 35 is turned counterclockwise in FIGURES 4a and 4b, the path lengths of waves d and e are correspondingly increased; as are those of waves f and g. This is because the tail sections 36, 36 of the rotor recede from the corresponding walls 34 and reflecting barriers 40. The minimum path lengths occurs just as the rotor tails 36 pass the 34, 40 regions of the stator 11, and increase until they pass through the next successive set, when the reflection action (and wave recombinations) is disrupted for a short fractional interval.

The cyclic result is in a saw-tooth characteristic variation of the path lengths. The net result is a cyclic sawtooth variation in the phase of the emergent ray a' from an established minimum to maximum angle for a given scanner and frequency range thereof, as will now be understood by those skilled in the art. It is to be understood that the described emergent wave phase displacement action for wave a' at the inner scanner region (25), also occurs in like manner for the emergent wave b' for the B channel line source.

The phase controlled emergent wave a' passes along the outer passage 30, 31 to the parallel plate region transmission line 15 comprising plates 41, 42 coupled to the stator passage. Thus the wave a' is the output wave for channel A, conducted through the aperture 15 as output A' with the rapidly scanned wave front. Similarly the b' wave passes between parallel plates 42, 43 of the output line as wave b'', and the channel B oscillated wave front signal B' results. Both output waves A' and B' are effectively in the same scanning plane, being adjacent and similarly oscillated.

Reference to the wider diameter scanner region (26) illustrates the same wave action as occurs in the region (25), as hereinabove described. The emergent wave a' in the outer A passage (30, 31) enters the parallel plate region transmission line across plates 41, 42 as wave a''; and passes through the aperture 15 as a component of the A' wave. Likewise, the outer b' wave, passes across plates 42, 43; and becomes part of the B' wave.

Thus, as one examines the phase shifts along the scanner 10, the resultant effect on the coupler emergent waves, as a' and b', is a greater phase shift for a larger scanner diameter at that position. The effect is continuous along the conical array, and a continuously changing linear wave front results for the final output A' and B' waves. This is due to the inherently longer path traversed by the split and recombined waves, for a larger diameter region.

The scanner 10 hereof thus provides rapid scanning of the direction of propagation of energy from a microwave line source as A, or for two simultaneous sources A and B. The TEM mode between parallel conduction surfaces is preferred in practice, as set forth. In general, the invention hereof may be viewed as splitting each channel wave energy, e.g. TEM, into two equal parts that then are made to propagate down two arms of a three db directional coupler.

The couplers (32) extend across the whole scanner, as do the respective line sources (A, B). Reflector barriers (40) in the stator (11) are used to reflect all the energy in each of the two arms (per channel). By symmetrical positioning of the barriers, all the reflected energy recombines and path lengths increase for increasing diameters along the conical scanner array. As each of the path lengths, at any one axial position, increases by 180° of phase, for example, the output energy will be retarded by one wave length, and the mode of operation may be compared to that of a Foster scanner. However, the use of two (A', B') channels simultaneously, in a common plane, as for monopulse radar scanning, is a particular advantage flowing from the invention system.

Although this invention has been described in connection with an exemplary version, it is to be understood that modifications and variations may be made by those skilled in the art that fall within the broader spirit and scope thereof, as set forth in the following claims.

I claim:
1. A rapid scanner of a microwave line source signal comprising a stator of conical configuration having a series of spaced outer, intermediate and inner shells, means introducing wave signal energy to said outer shell, a three db directional coupler along the intermediate shell for dividing incident wave signal energy from between the outer and intermediate shell passage into two equal parts and directing each part into opposite peripheral directions at a radially inward position, a rotor coacting with said stator to establish scanner signal passages incorporating a plurality of wave signal deflecting bodies for directing peripheral wave signal energy incident on said bodies into radially adjacent signal passages through the rotor and into the opposite peripheral direction, and means associated with said stator for reflecting the divided wave signal parts back through their scanner signal passages between said rotor and said shells to said directional coupler, whereby said directional coupler recombines the wave signal parts into a unit signal wave directed peripherally between said outer and intermediate shells as an effective continuation of the original incident line signal energy with the phase thereof displaced along its wave front in accordance with the rotor rotation rate and the axial position thereof along the scanner.

2. A rapid scanner of a microwave signal comprising a stator having a series of spaced shells, means introducing wave signal energy at an external region of said scanner, a directional coupler for dividing incident wave signal energy into two parts and directing each part into opposite directions, a rotor coacting with said stator to establish scanner signal passages varying in accordance with the angular position of said rotor with respect to said stator; said scanner signal passages incorporating a plurality of wave signal deflecting bodies for directing peripheral wave signal energy incident on said bodies through the rotor, and means for reflecting the divided wave signal parts back through their scanner signal passages to said directional coupler, whereby said directional coupler recombines the wave signal parts into a unit signal wave with the phase thereof displaced in accordance with the axial position thereof along the scanner and the angular position of said rotor, further including a second directional coupler for dividing incident wave signal energy from a second signal wave into two parts, said second signal wave parts being arranged to independently coact with said rotor and stator and recombine into a second unit signal wave with phase displacements corresponding to that of the first said unit signal wave.

3. A rapid scanner as claimed in claim 2, further including a dual parallel plate region transmission line coupled to said stator for conducting the first and second phase displaced unit signal waves into a common planar path.

4. A rapid scanner of a microwave signal comprising a stator of conical configuration having spaced outer, intermediate and inner shells, means introducing wave signal energy to said outer shell, a directional coupler along the intermediate shell for dividing incident wave signal energy from between the outer and intermediate shell passage into two parts and directing each part into opposite peripheral directions at a radially inward position, a rotor coacting with said stator to establish scanner signal passages incorporating a plurality of wave signal deflecting bodies for directing peripheral wave signal energy incident on said bodies through the rotor and into the opposite peripheral direction, and means associated with said stator for reflecting the divided wave signal parts back through their scanner signal passages between said rotor and said shells to said directional coupler, whereby said directional coupler recombines the wave signal parts into a unit signal wave directed peripherally between said outer and intermediate shells as an effective continuation of the original incident line signal energy with the phase thereof displaced along its wave front in accordance with the axial position thereof along the scanner, further including a second directional coupler along a separate section of the intermediate shell for dividing incident wave signal energy from a second signal wave into two parts simultaneously with the first signal wave and coupler action, said second signal wave parts being arranged to independently coact with said rotor and stator and recombine into a second unit signal wave with phase displacements along its wave front corresponding to that of the first said unit signal wave.

5. A rapid scanner as claimed in claim 1, further including a second three db directional coupler along a separate section of the intermediate shell for dividing incident wave signal energy from a second line source signal wave into two equal parts simultaneously with the first signal wave and coupler action, said second signal wave parts being arranged to independently coact with said rotor and stator and recombine into a second unit signal wave with phase displacements along its wave front corresponding to that of the first said unit signal wave.

6. A rapid scanner as claimed in claim 5, further including a dual parallel plate region transmission line coupled to said stator for conducting the first and second phase displaced unit signal waves into a common planar path.

References Cited in the file of this patent
UNITED STATES PATENTS

| | | |
|---|---|---|
| 2,521,844 | Gordy | Sept. 12, 1950 |
| 2,572,628 | Kock | Oct. 23, 1951 |
| 2,832,936 | Foster | Apr. 29, 1958 |
| 3,005,985 | Cohn et al. | Oct. 24, 1961 |